(12) United States Patent
Hayata

(10) Patent No.: US 9,292,929 B2
(45) Date of Patent: Mar. 22, 2016

(54) IMAGE REGION EXTRACTION DEVICE, IMAGE REGION EXTRACTION METHOD, AND IMAGE REGION EXTRACTION PROGRAM

(71) Applicant: Panasonic Intellectual Property Corporation of America, Torrance, CA (US)

(72) Inventor: Keisuke Hayata, Kanagawa (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 0 days.

(21) Appl. No.: 14/361,362

(22) PCT Filed: Nov. 30, 2012

(86) PCT No.: PCT/JP2012/007713
§ 371 (c)(1),
(2) Date: May 29, 2014

(87) PCT Pub. No.: WO2013/088665
PCT Pub. Date: Jun. 20, 2013

(65) Prior Publication Data
US 2014/0355882 A1    Dec. 4, 2014

(30) Foreign Application Priority Data

Dec. 16, 2011  (JP) ................................ 2011-275877

(51) Int. Cl.
*G06K 9/34*    (2006.01)
*G06T 7/00*    (2006.01)

(52) U.S. Cl.
CPC ..... *G06T 7/0081* (2013.01); *G06T 2207/10028* (2013.01); *G06T 2207/20081* (2013.01); *G06T 2207/20096* (2013.01); *G06T 2207/20104* (2013.01)

(58) Field of Classification Search
None
See application file for complete search history.

(56) References Cited

U.S. PATENT DOCUMENTS 6,674,905 B1    1/2004  Matsugu et al.
2006/0029275 A1   2/2006  Li et al.
(Continued)

FOREIGN PATENT DOCUMENTS

| CN | 102165487 A | 8/2011 |
|----|-------------|--------|
| JP | 2000-216979 A | 8/2000 |

(Continued)

OTHER PUBLICATIONS

Nagahashi, Tomoyuki, Hironobu Fujiyoshi, and Takeo Kanade. "Image segmentation using iterated graph cuts based on multi-scale smoothing."Computer Vision-ACCV 2007. Springer Berlin Heidelberg, 2007. 806-816.*

(Continued)

*Primary Examiner* — Andrew Moyer
(74) *Attorney, Agent, or Firm* — Pearne & Gordon LLP

(57) ABSTRACT

An image region extraction device for extracting a target region on the basis of a designated region with high precision. An image region extraction device (100) extracts a target region from an image on the basis of a designated region and is provided with: a spatial change learning unit (180) for acquiring, for each section of the image, a pixel value changing pattern which is a characteristic of the spatial changes in a pixel value component, and a distance changing pattern which is a characteristic of the spatial changes in a distance component extending from a reference position to a photographic object; and a region dividing unit (210) for extracting a target region on the basis of the similarities between the pixel value changing pattern and the distance changing pattern among the designated region and each section of the image.

11 Claims, 13 Drawing Sheets

(56) References Cited

U.S. PATENT DOCUMENTS

2008/0310716 A1* 12/2008 Jolly et al. .................. 382/173
2011/0164814 A1   7/2011 Onai et al.

FOREIGN PATENT DOCUMENTS

| JP | 2005-293367 A | 10/2005 |
| JP | 2006-053919 A | 2/2006 |
| JP | 2010-039999 A | 2/2010 |
| JP | 2010-079477 A | 4/2010 |

OTHER PUBLICATIONS

Tomoyuki Nagahashi, Hironobu Fujiyoshi, Takeo Kanade, "Iterated Graph Cuts by Multi-level Smoothing for Image Segmentation" MIRU2007, Jul. 2007.

International Search Report for Application No. PCT/JP2012/007713 dated Mar. 5, 2013.

* cited by examiner

| DISPERSION OF DISTANCE COMPONENTS 361 | DISPERSION OF PIXEL VALUE COMPONENTS 362 | PIXEL VALUE INFORMATION COEFFICIENT α 363 | DISTANCE INFORMATION COEFFICIENT β 364 |
|---|---|---|---|
| LOWER THAN $\theta_{d1}$ | LOWER THAN $\lambda_{c1}$ | 0.5 | 0.5 |
| | EQUAL TO OR HIGHER THAN $\lambda_{c1}$ AND LOWER THAN $\lambda_{c2}$ | 0.3 | 0.7 |
| | EQUAL TO OR HIGHER THAN $\lambda_{c2}$ | 0.1 | 0.9 |
| EQUAL TO OR HIGHER THAN $\theta_{d1}$ | LOWER THAN $\lambda_{c3}$ | 0.9 | 0.1 |
| | EQUAL TO OR HIGHER THAN $\lambda_{c3}$ AND LOWER THAN $\lambda_{c4}$ | 0.7 | 0.3 |
| | EQUAL TO OR HIGHER THAN $\lambda_{c4}$ | 0.5 | 0.5 |

FIG. 13

IMAGE REGION EXTRACTION DEVICE, IMAGE REGION EXTRACTION METHOD, AND IMAGE REGION EXTRACTION PROGRAM

TECHNICAL FIELD

The present invention relates to an image region extracting apparatus, an image region extracting method, and an image region extracting program for extracting a region from an image.

BACKGROUND ART

Techniques for automatically extracting a specific region from an image are utilized in various fields such as a medical field, an image processing field, a production control field, and an environment recognition field. An image segmentation technique is known as one of these techniques (see, PTL 1, PTL 2 and NPL 1, for example).

In the technique disclosed in PTL 1, a designation of a region (hereinafter, referred to as a "designation region") which designates a region to be extracted (hereinafter, referred to as a "target region") is received from a user. The target region is, for example, a foreground portion of an image, while the designation region is, for example, a portion including a trajectory of the drag operation performed by the user on the image. PTL 1 discloses a technique for extracting as a target region a range which is continuous with the designation region and in which a difference between pixel values of adjacent pixels is equal to or smaller than a predetermined threshold.

PTL 2 discloses a technique for extracting as a target region a region in which a difference in a distance between the region and a designation region is equal to or smaller than a predetermined threshold. Here, the distance refers to a distance component from a reference position such as a viewpoint of a camera to a subject.

NPL 1 discloses a technique called a graph cut method, in which a target region is extracted based on similarities of a pixel value component and a distance component between the region and a designation region and connectivity of pixel values between adjacent pixels.

The related arts mentioned above enable a target region to be extracted from an image only by designation of part of the target region without designation of the entire target region.

CITATION LIST

Patent Literature

PTL 1
Japanese Patent Application Laid-Open No. 2010-79477
PTL 2
Japanese Patent Application Laid-Open No. 2010-39999

Non-Patent Literature

NPL 1
Tomoyuki NAGAHASHI, Hironobu FUJIYOSHI, Takeo KANADE, "Iterated Graph Cuts by Multi-level Smoothing for Image Segmentation" MIRU2007, July, 2007

SUMMARY OF INVENTION

Technical Problem

However, the above-described related arts have a problem of difficulty to extract a target region with high accuracy based on a designation region for the reason described below.

For example, the technique disclosed in PTL 1 has a problem of difficulty to extract a target region where change of a pixel value inside is large or where change of a pixel value at a boundary portion is small. This is because the target region is extracted based on a difference between the pixel values of adjacent pixels, in the technique disclosed in PTL 1.

Further, the technique disclosed in PTL 2 has a problem of difficulty to extract a target region where change of a distance inside is large or where change of a distance at a boundary portion is small. This is because the target region is extracted based on a difference in a distance between the region and the designation region, in the technique disclosed in PTL 2.

Further, the technique disclosed in NPL 1 has a problem of difficulty to extract a target region where a pixel value is similar between the target region and other parts and change of a distance inside is large or change of a distance at a boundary portion is small. This is because the target region is extracted based on similarities of a pixel value component and a distance component between a part and the designation region and connectivity of the pixel values between adjacent pixels, in the technique disclosed in NPL 1.

For example, there is a possible case where there is an image of scenery where a foliage plant, which is a target region, is put in front of a floral design wallpaper with a green background. In such a case, in a target part, there is large change of a pixel value and a distance inside and small change of a pixel value and a distance at a boundary portion, and there is a small difference in the pixel value between the target part and other parts. Accordingly, it is difficult to extract the foliage plant which is the target region with the above-described related arts.

It is therefore an object of the present invention to extract a target region with high accuracy based on a designation region.

Solution to Problem

An image region extracting apparatus according to an aspect of this disclosure is an apparatus that extracts a target region from an image based on a designation region, the apparatus including: a spatial change learning section that acquires a pixel value change pattern and a distance change pattern of each part of the image, the pixel value change pattern being a spatial change characteristic of a pixel value component, and the distance change pattern being a spatial change characteristic of a distance component from a reference position to a subject; and a region dividing section that extracts the target region based on similarities of the pixel value change pattern and the distance change pattern between the designation region and each part of the image.

An image region extracting method according to an aspect of this disclosure is a method for extracting a target region from an image based on a designation region, the method including: acquiring a pixel value change pattern and a distance change pattern of each part of the image, the pixel value change pattern being a spatial change characteristic of a pixel value component, and the distance change pattern being a spatial change characteristic of a distance component from a reference position to a subject; and extracting the target region based on similarities of the pixel value change pattern and the distance change pattern between the designation region and each part of the image.

An image region extracting program according to an aspect of this disclosure is a program stored on a non-transitory computer medium for extracting a target region from an image based on a designation region, the program causing a computer to execute processing including: acquiring a pixel value change pattern and a distance change pattern of each part of the image, the pixel value change pattern being a spatial change characteristic of a pixel value component, and the distance change pattern being a spatial change characteristic of a distance component from a reference position to a subject; and extracting the target region based on similarities of the pixel value change pattern and the distance change pattern between the designation region and each part of the image.

Advantageous Effects of Invention

According to the present disclosure, it is possible to extract a target region with high accuracy based on a designation region.

BRIEF DESCRIPTION OF DRAWINGS

FIG. 13 illustrates an example of content of a weight determination table in Embodiment 3;

DESCRIPTION OF EMBODIMENTS

Embodiments of the present invention will be described in detail with reference to the accompanying drawings.

Embodiment 1

Embodiment 1 of the present invention is an example of a basic mode of the present invention.

Figure 1:
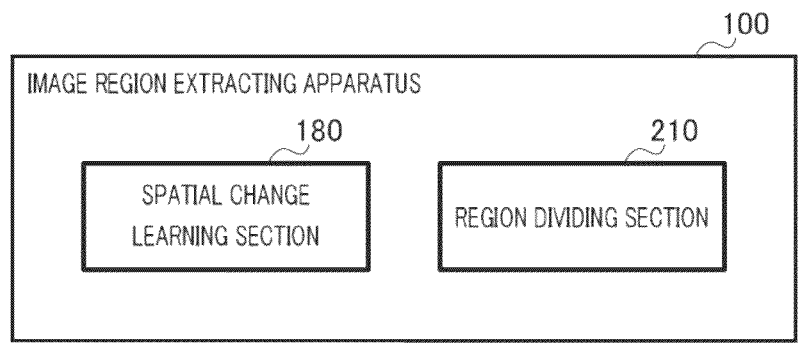
FIG. 1 is a block diagram illustrating an example of a configuration of an image region extracting apparatus according to Embodiment 1 of the present invention.

FIG. 1 is a block diagram illustrating an example of a configuration of an image region extracting apparatus according to this embodiment.

In FIG. 1, image region extracting apparatus 100, which extracts a target region from an image based on a designation region, includes spatial change learning section 180 and region dividing section 210.

Spatial change learning section 180 acquires a pixel value change pattern and a distance change pattern in each part of the image. The pixel value change pattern is a spatial change characteristic of pixel value components, while the distance change pattern is a spatial change characteristic of distance components from a reference position to a subject.

Region dividing section 210 extracts a target region based on similarities of the pixel value change pattern and the distance change pattern between the designation region and each part of the image.

Image region extracting apparatus 100, though not shown, has, for example, a CPU (Central Processing Unit), a storage medium such as a ROM (Read Only Memory) for storing a control program, and a working memory such as a RAM (Random Access Memory). In this case, functions of the above-described sections are realized by the CPU executing the control program.

Image region extracting apparatus 100 can extract a target region based on the similarities of the pixel value change pattern and the distance change pattern between the designation region and each part of the image.

Specifically, for example, it is assumed that in the target region, there is large change of a pixel value and a distance inside and small change in a pixel value and a distance at a boundary portion, and there is a small difference in a pixel value between the target region and other parts. Image region extracting apparatus 100 can extract such a target region by using similarities of the pixel value change pattern and the distance change pattern. That is, image region extracting apparatus 100 can extract a target region with higher accuracy than the related arts based on a designation region.

Embodiment 2

Embodiment 2 of the present invention is an example of a specific mode where the present invention is applied to an apparatus provided with a stereo camera.

First, a configuration of an image region extracting apparatus according to this embodiment will be described.

Figure 2:
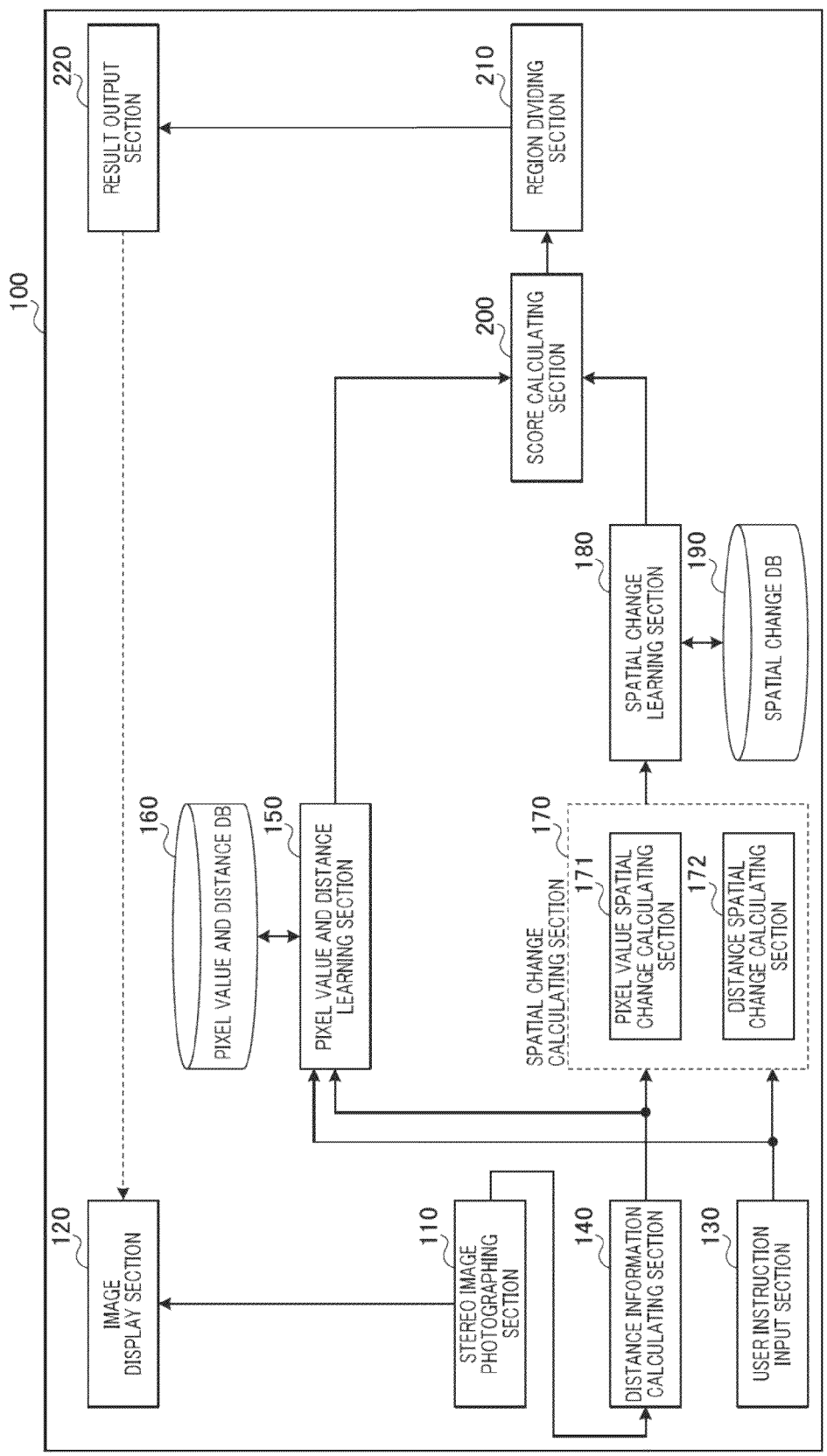
FIG. 2 is a block diagram illustrating an example of a configuration of an image region extracting apparatus according to Embodiment 2 of the present invention.

FIG. 2 is a block diagram illustrating an example of the configuration of the image region extracting apparatus according to this embodiment.

In FIG. 2, image region extracting apparatus 100 is an apparatus which extracts a target region from an image. Image region extracting apparatus 100 has stereo image photographing section 110, image display section 120, user instruction input section 130, distance information calculating section 140, pixel value and distance learning section 150 and pixel value and distance database (DB) 160. Image region extracting apparatus 100 further includes spatial change calculating section 170, spatial change learning section 180, spatial change database (DB) 190, score calculating section 200, region dividing section 210 and result output section 220.

Stereo image photographing section 110 receives a stereo image as input. Specifically, stereo image photographing section 110 acquires the stereo image through a stereo camera (not shown). Stereo image photographing section 110 then outputs image data of the acquired stereo image (hereinafter, simply referred to as a "stereo image") to image display section 120 and distance information calculating section 140.

It should be noted that the stereo image is formed of a left eye image and a right eye image. In this embodiment, a case will be described where the left eye image is used as a target for region extraction. In this case, stereo image photographing section 110 may output only the left eye image among the stereo image to image display section 120.

Image display section 120 displays the left eye image on a screen based on data of the input left eye image (hereinafter, simply referred to as a "left eye image"). Image display section 120 is, for example, a liquid crystal display.

User instruction input section 130 receives input of a designation region from a user. User instruction input section 130 is, for example, a touch panel provided at the liquid crystal display or a pointing device such as a mouse. In this case, the user can set any region of the left eye image as the designation region by contact of his finger or a stylus pen with the touch panel or by operation of the mouse. That is, in this embodiment, the designation region is a region of the left eye image designated by the user. User instruction input section 130 outputs designation region information indicating the designation region to pixel value and distance learning section 150 and spatial change calculating section 170.

Distance information calculating section 140 acquires a pixel value component and a distance component of each part of the left eye image from the left eye image. More specifically, distance information calculating section 140 specifies a corresponding pixel pair of the left eye image and the right eye image from the input stereo image by way of image matching, or the like. Distance information calculating section 140 calculates a distance component of each position (for example, each pixel position) of the left eye image from a disparity of the corresponding pixel pair using a stereo method, or the like.

Here, the pixel value component refers to color or luminance represented by a pixel, or a color component indicating color, or a luminance component indicating luminance. Further, the distance component refers to a distance from a reference position such as a viewpoint of a stereo camera to a subject or a distance component indicating the distance. Still further, the stereo method refers to a method for calculating a distance from a disparity of a corresponding pixel pair by way of the principle of triangulation using an installation parameter (camera parameter) of the stereo camera.

Distance information calculating section 140 outputs depth information indicating the acquired distance component of each part and the left eye image to pixel value and distance learning section 150 and spatial change calculating section 170. It should be noted that distance information calculating section 140 may generate and output a left eye distance image obtained by adding the distance component of each pixel to the left eye image.

Pixel value and distance learning section 150 calculates similarities of the pixel value component and the distance component between each part of the input left eye image and a region (designation region) indicated by the input designation region information.

More specifically, pixel value and distance learning section 150 calculates an average and standard deviation of the pixel value components in the designation region and an average and standard deviation of the distance components in the designation region. Pixel value and distance learning section 150 stores the calculation results in pixel value and distance database 160 as designation region information.

Pixel value and distance learning section 150 then calculates the above-described similarities of the pixel value component and the distance component for each part of the left eye image using the designation region information. Pixel value and distance learning section 150 outputs the calculated similarities of the pixel value component and the distance component of each part to score calculating section 200.

Pixel value and distance database 160 stores the above-described designation region information.

Spatial change calculating section 170 calculates a spatial change of the pixel value components and a spatial change of the distance components for each part of the left eye image. Here, the spatial change refers to a value change between two or more consecutive pixels, and is, for example, expressed by a change amount vector. Spatial change calculating section 170 outputs the calculated spatial changes of the pixel value components and the distance components for each part and the designation region information to spatial change learning section 180.

It should be noted that, as illustrated in FIG. 2, spatial change calculating section 170 may have pixel value spatial change calculating section 171 for calculating a spatial change of the pixel value components and distance spatial change calculating section 172 for calculating a spatial change of the distance components.

Spatial change learning section 180 acquires a pixel value change pattern which is tendency of the spatial change of the pixel value components and a distance change pattern which is tendency of the spatial change of the distance components for each part of the left eye image. The pixel value change pattern is a spatial change characteristic of the pixel value components, while the distance change pattern is a spatial change characteristic of the distance components from the reference position to the subject. Spatial change learning section 180 calculates similarities of the pixel value change pattern and the distance change pattern between each part of the left eye image and the region (designation region) indicated by the input designation region information.

More specifically, spatial change learning section 180 calculates an average and standard deviation in Gaussian distribution of the pixel value change patterns in the designation region and an average and standard deviation in Gaussian distribution of the distance change patterns in the designation region. Spatial change learning section 180 stores the calculation results in spatial change database 190 as designation region spatial change information.

Spatial change learning section 180 calculates the above-described similarities of the pixel value change pattern and the distance change pattern for each part of the left eye image using the designation region spatial change information. Pixel value and distance learning section 150 outputs the calculated similarities of the pixel value change pattern and the distance change pattern to score calculating section 200.

Spatial change database 190 stores the above-described designation region spatial change information.

Score calculating section 200 calculates a score based on the input similarity of the spatial change pattern and similarities of the pixel value component and the distance component for each part of the left eye image. Here, the score refers to an index value indicating a likelihood that the region is a target region, and, for example, is energy E(p) which will be described later. In this case, a higher score indicates a higher likelihood that the region is a target region.

Region dividing section 210 extracts a target region based on the similarities of the pixel value change pattern and the distance change pattern (similarity of the spatial change pattern) and the similarities of the pixel value component and the distance component between the designation region and each part of the left eye image. More specifically, region dividing section 210 extracts a target region from the left eye image using a graph cut method (see NPL 1) based on the input score of each part. Region dividing section 210 then outputs the extraction result of the target region to result output section 220.

Result output section 220 outputs information indicating the input extraction result of the target region. More specifically, result output section 220 outputs extraction result information indicating, as an image, which region of the left eye image is extracted as the target region to image display section 120. The extraction result information is, for example, information which is used by image display section 120 to display the target region by cutting out only the target region from the left eye image being displayed or display the target region by overlapping an image indicating the target region on the left eye image being displayed. Alternatively, the extraction result information is data of an image which is obtained by cutting out only the target region from the left eye image.

Although not illustrated, image region extracting apparatus 100 includes, for example, a CPU, a storage medium such as a ROM which stores a control program and a working memory such as a RAM. In this case, functions of the above-described sections are realized by the CPU executing the control program.

Image region extracting apparatus 100 having the above-described configuration can extract a target region based on similarities of a pixel value change pattern and a distance change pattern between a designation region and each part of an image.

For example, even when the target region is a region where there is large change of the pixel value and the distance inside and small change of the pixel value and the distance at the boundary portion, and there is a small difference in the pixel value between the region and the other parts, image region extracting apparatus 100 can extract such a target region.

That is, image region extracting apparatus 100 can extract a target region based on a designation region with higher accuracy than the related arts.

Further, image region extracting apparatus 100 can acquire a distance component of each part of the image by utilizing a stereo image. That is, image region extracting apparatus 100 can be simply mounted on an apparatus provided with a stereo camera with minor modifications. For example, image region extracting apparatus 100 can be easily implemented on a smart phone provided with a stereo camera and a touch panel, by downloading an application program.

Further, image region extracting apparatus 100 can extract a region a user desires to extract with high accuracy and can present the extracted region to the user.

The configuration of image region extracting apparatus 100 has been described above.

The operation of image region extracting apparatus 100 will be described next.

Figure 3:
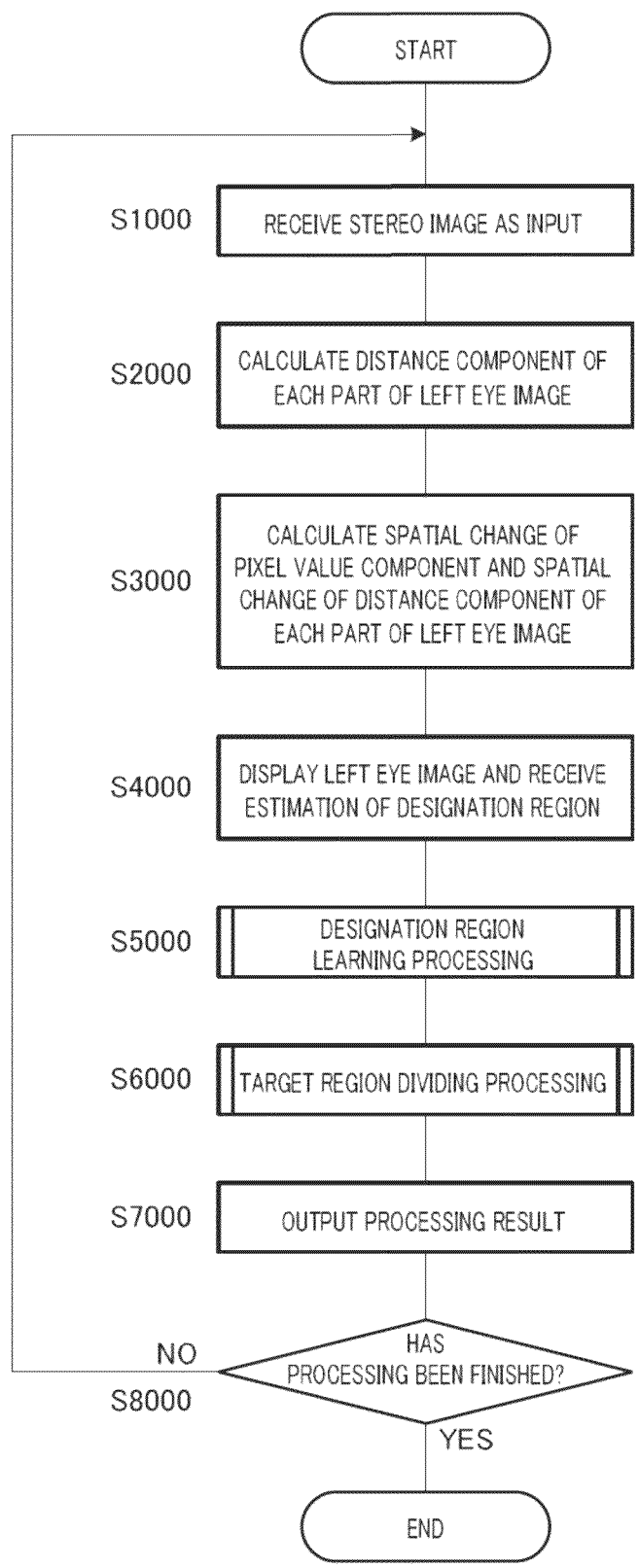
FIG. 3 is a flowchart illustrating an example of operation of the image region extracting apparatus according to Embodiment 2.

FIG. 3 is a flowchart illustrating an example of the operation of image region extracting apparatus 100.

In step S1000, stereo image photographing section 110 receives a stereo image as input.

In step S2000, distance information calculating section 140 calculates a distance component of each part (for example, each pixel) of a left eye image.

An example of a method for calculating a distance component will be described below.

Distance information calculating section 140 performs image matching between a left eye image and a right eye image and calculates a matching score for each combination of pixels of the left eye image and pixels of the right eye image. The matching score is a value indicating a likelihood that the pixels of the left eye image and the pixels of the right eye image are obtained by photographing the same object or background part. Distance information calculating section 140 specifies a pixel of the right eye image with the highest matching score for each pixel of the left eye image and determines a pair of the specified pixel and the pixel of the left eye image as a corresponding pixel pair.

The image matching method includes, for example, a method in which the both of the right eye image and the left eye image are divided into blocks, and a degree of match of each block between the images is obtained. In this method, a value based on the degree of match can be used as a matching score. In a method for evaluating the degree of match of each block between the images, for example, a sum of luminance difference (SAD: Sum of Absolute Difference) and a sum of squares of a luminance value (SSD: Sum of Squared Difference) can be used. Further, the method for evaluating the degree of match of each block between the images includes, for example, Normalized Cross-Correlation (NCC).

In SAD and SSD, the evaluation value is a positive value, and when the evaluation value is smaller, the degree of match is higher. Therefore, it is possible to express the matching score with a function which is higher when the evaluation value is smaller, for example, an inverse of the evaluation value or a value obtained by subtracting the evaluation value from a constant. In NCC, the evaluation value takes a value from 1 to −1, and, when the evaluation value is 1, the degree of match is the highest. Therefore, it is possible to use the evaluation value as a matching score. It is, of course, possible to express the matching score with a function which increases a weight for a higher evaluation value, for example, a value obtained by cubing the estimation value.

Distance information calculating section 140 acquires a disparity for each corresponding pixel pair, and calculates a distance of the corresponding pixel pair from the acquired disparity and the camera parameter using the stereo method. Distance information calculating section 140 uses the calculated distance of the corresponding pixel pair as a distance component at a position of the pixel on the left eye image among the corresponding pixel pair.

Figure 4:
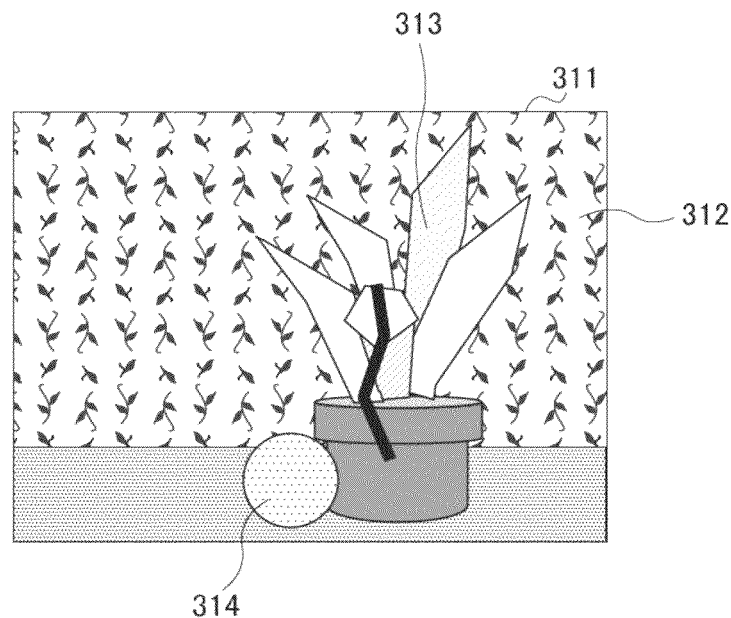
FIG. 4 illustrates an example of an input image in Embodiment 2.

FIG. 4 illustrates an example of the left eye image input by stereo image photographing section 110. Further, FIG. 5 illustrates an example of a distance image of the left eye image illustrated in FIG. 4.

Left eye image 311 illustrated in FIG. 4 is a color image or a grayscale image. Left eye image 311 is an image of scenery where foliage plant 313 and ball 314 are put in front of floral design wallpaper 312 with a green background.

Figure 5:
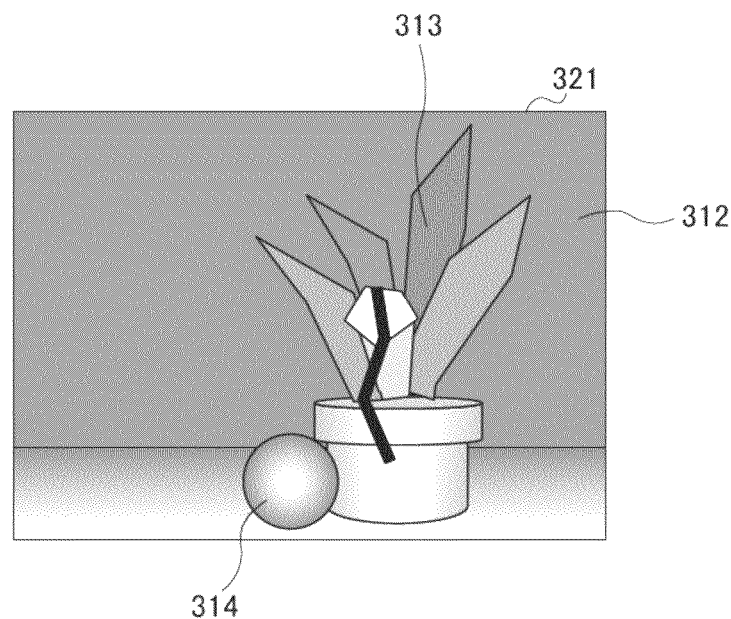
FIG. 5 illustrates an example of a range image in Embodiment 2.

In FIG. 5, distance image 321 is a grayscale image which indicates a distance using shading. Here, a closer distance is indicated with higher luminance which is closer to white. Distance image 321 is irrelevant to texture information of the object. That is, even when wallpaper 312 includes patterns as illustrated in FIG. 4, information of the patterns is not reflected on a region of wallpaper 312 in distance image 321 as illustrated in FIG. 5. Values of the distance components are uniform in the region of wallpaper 312.

In this case, as can be seen from FIG. 4 and FIG. 5, in the region of foliage plant 313, there is large change of the pixel value and the distance inside and small change of the pixel value and the distance at the boundary portion with other parts (region of wallpaper 312 and ball 314). Further, there is a small difference in the pixel value between the region of foliage plant 313 and the other part. That is, with the above-described related arts, it is difficult to extract foliage plant 313.

In step S3000 in FIG. 3, spatial change calculating section 170 calculates a spatial change of the pixel value components and a spatial change of the distance components in each part of the left eye image.

An example of the spatial change of the pixel value components and the spatial change of the distance components will be described below.

Figure 6:
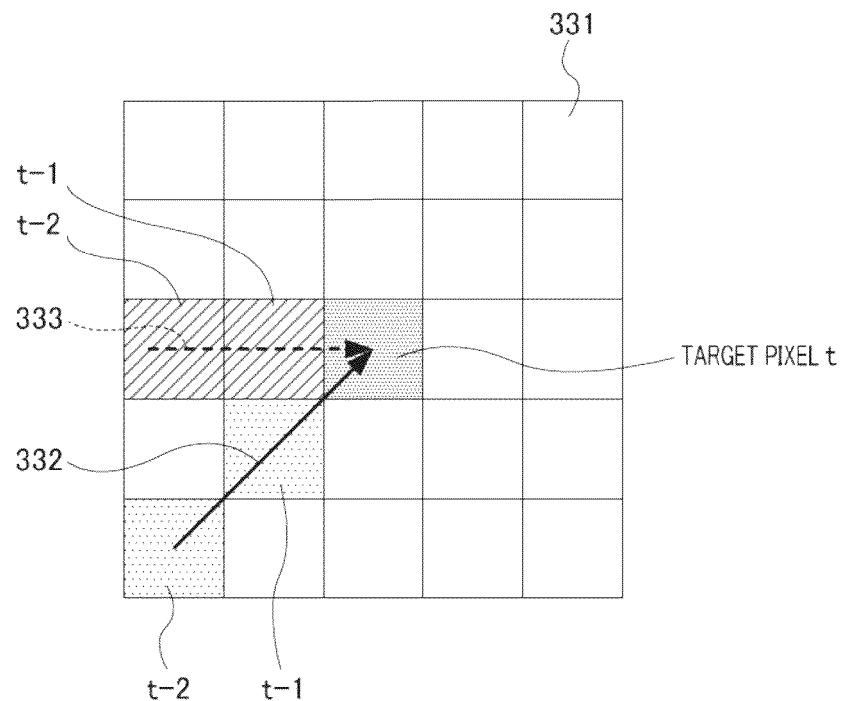
FIG. 6 illustrates an example of a method for calculating spatial change of a pixel value in Embodiment 2.

FIG. 6 illustrates an example of a method for calculating spatial change of the pixel value. Further, FIG. 7 illustrates another example of the method for calculating the spatial change of the pixel value.

Figure 7:
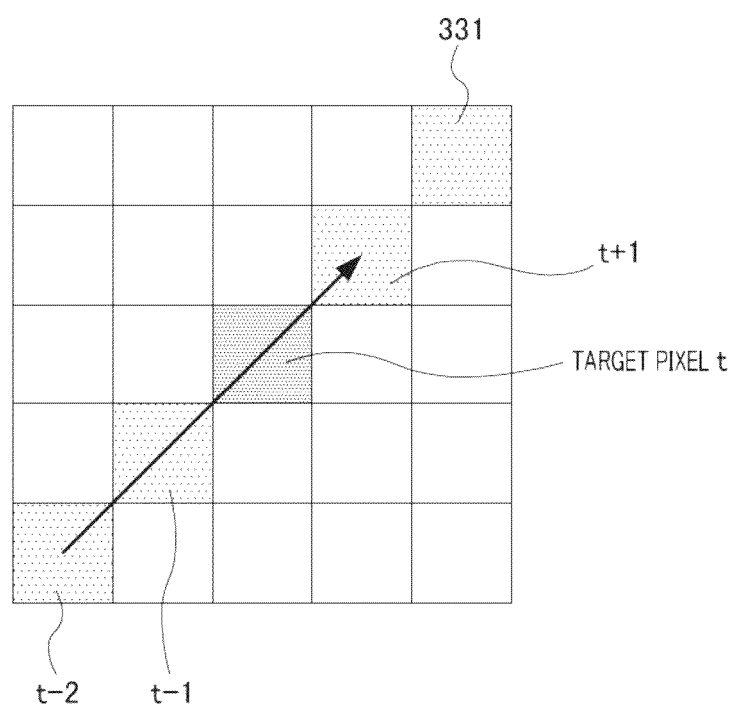
FIG. 7 illustrates another example of the method for calculating the spatial change of the pixel value in Embodiment 2 of the present invention.

Each block 331 illustrated in FIG. 6 and FIG. 7 indicates one pixel in the left eye image. It should be noted that FIG. 6 and FIG. 7 illustrate only pixels within a distance corresponding to two pixels from a target pixel.

Here, as illustrated in FIG. 6, consecutive pixels on a straight line with its end point being target pixel t in the center are assumed to be pixels (hereinafter, referred to as "neighboring pixels") used for expressing spatial change. In this case, a neighboring pixel group can be expressed as, for example, neighboring pixels t−1, t−2, . . . , t−m in the order closer from target pixel t.

Further, as illustrated in FIG. 7, it is also possible to set the consecutive pixels on the straight line which passes target pixel t as the neighboring pixels, instead of using target pixel t as the end point of the neighboring pixels. In this case, the neighboring pixel group can be expressed as, for example, neighboring pixels t−1, t−2, . . . , t−m, and neighboring pixels t+1, t+2, . . . , t+m in the order closer to target pixel t.

A direction of alignment of the neighboring pixel group is a direction in which spatial change is examined. As illustrated in FIG. 6, the direction in which the spatial change is examined may be, for example, direction 332 upward sloping at an angle of 45 degrees or right horizontal direction 333. Further, a direction in which the spatial change is examined may be one direction or a plurality of directions. Spatial change calculating section 170 can reduce processing load when the spatial change is examined in a smaller number of directions and can improve detection accuracy when the spatial change is examined in a larger number of directions.

Further, for example, when the designation region is designated by dragging operation of the user, spatial change calculating section 170 may set a direction of a line generated by the dragging operation as the direction for examining the spatial change.

In this embodiment, it is assumed as an example that there are m neighboring pixels, and the neighboring pixels are expressed as neighboring pixels t−1, t−2, t−m. In this case, spatial change calculating section 170 outputs change amount vector $V_{comb}$ expressed with following equation 1 as the spatial changes of the pixel value components and the distance components. In the equation, $V_{color}$ indicates a change amount vector indicating the spatial change of the pixel value components, and $V_{dist}$ indicates a change amount vector indicating the spatial change of the distance components.

[1]

$$V_{comb}^m = \begin{pmatrix} V_{color}^m \\ V_{dist}^m \end{pmatrix} \quad \text{(Equation 1)}$$

It should be noted that the change amount vector $V_{color}$ satisfies following equations 2 and 4, and the change amount vector $V_{dist}$ satisfies following equations 3 and 4. In the following description, the pixel value component and the distance component will be expressed as p. Further, indexes "color" and "dist" respectively indicate a parameter regarding the pixel value component and a parameter regarding the distance component.

[2]

$$V_{color}^m = \{d_{color}^{t-(m-1)}, d_{color}^{t-(m-2)}, \ldots, d_{color}^t\} \quad \text{(Equation 2)}$$

[3]

$$V_{dist}^m = \{d_{dist}^{t-(m-1)}, d_{dist}^{t-(m-2)}, \ldots, d_{dist}^t\} \quad \text{(Equation 3)}$$

[4]

$$d^t = p_t - p_{t-1} \quad \text{(Equation 4)}$$

In step S4000, image display section 120 displays the left eye image. User instruction input section 130 receives input of the designation region from the user.

Figure 8:
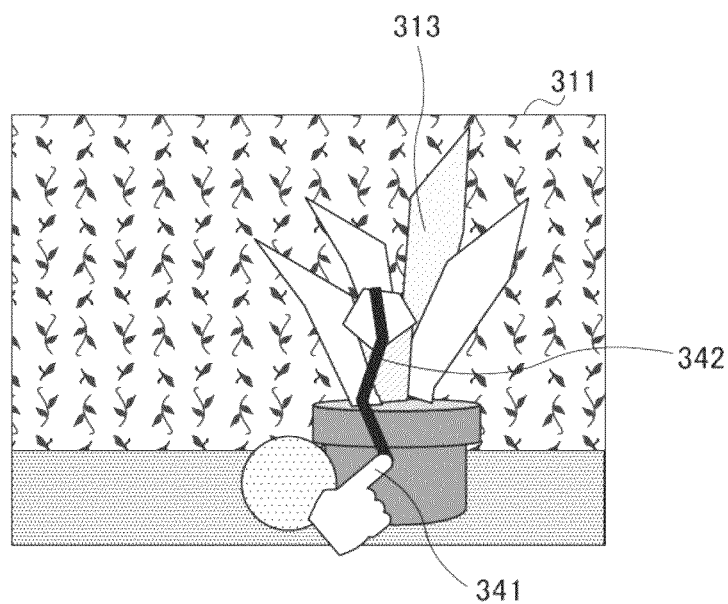
FIG. 8 illustrates an example of an aspect where a designation region is input in Embodiment 2.

FIG. 8 is a diagram illustrating an example of how the designation region is input, and corresponding to FIG. 4. In FIG. 8, a case will be described where the user designates foliage plant 313 as the target region.

As illustrated in FIG. 8, the user performs drag operation, for example, within a region of foliage plant 313 among left eye image 311 using finger 341 on the touch panel. User instruction input section 130 acquires region 342 in contact with finger 341 as the designation region. It should be noted that user instruction input section 130 may acquire a region larger than region 342 in contact with finger 341 by a predetermined range as the target region assuming that the user perform drag operation around the center of the target region.

The larger size of the target region provides more information of the target region to be utilized for learning. Therefore, if the size of the target region is larger, because a characteristic of the designation region represents a characteristic of the target region with higher accuracy, extraction accuracy of the target region improves.

It should be noted that the processing of step S4000 may be performed before the processing of step S3000 or before the processing of step S2000.

In step S5000, image region extracting apparatus 100 performs designation region learning processing. The designation region learning processing is processing for learning a characteristic of the designation region including the pixel value change pattern and the distance change pattern.

Figure 9:
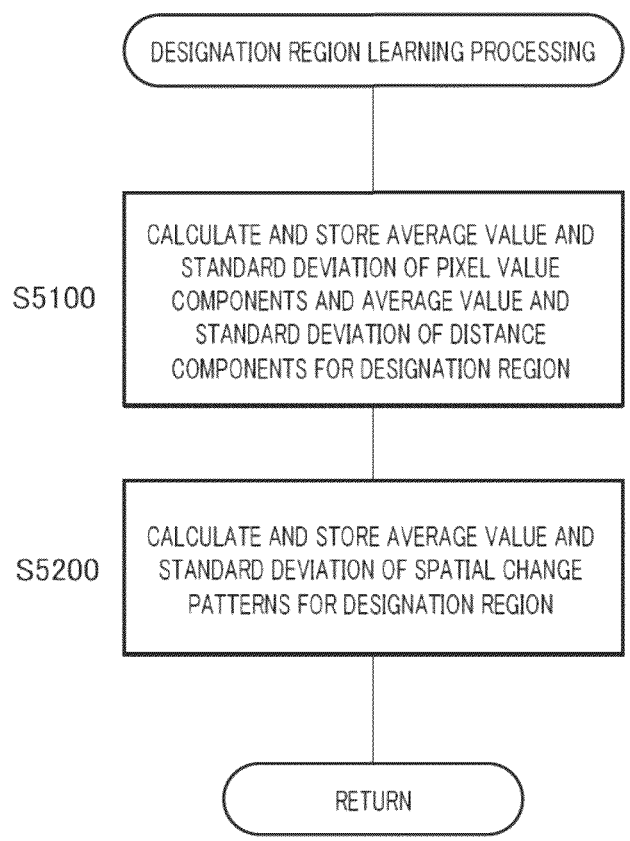
FIG. 9 is a flowchart illustrating an example of designation region learning processing in Embodiment 2.

FIG. 9 is a flowchart illustrating an example of the designation region learning processing (step S5000 in FIG. 3).

First, in step S5100, pixel value and distance learning section 150 calculates an average and standard deviation of the pixel value components and an average and standard deviation of the distance components in the designation region as designation region information. Pixel value and distance learning section 150 stores the calculated designation region information in pixel value and distance database 160.

In the following description, the average value and the standard deviation of the pixel value components in the designation region are respectively expressed as $p_{color}$ with an upper bar and $\sigma_{color}$ with an upper bar. Further, the average value and the standard deviation of the distance components in the designation region are respectively expressed as $p_{dist}$ with an upper bar and $\sigma_{dist}$ with an upper bar.

It should be noted that there may be a portion where the tendency of the spatial change of the pixel value components or the tendency of the spatial change of the distance components greatly changes inside the target region. In this embodiment, spatial change learning section 180 extracts the tendency of the spatial change of the pixel value components or the tendency of the spatial change of the distance components in the designation region including such great change to generate designation region spatial change information.

Figure 10:
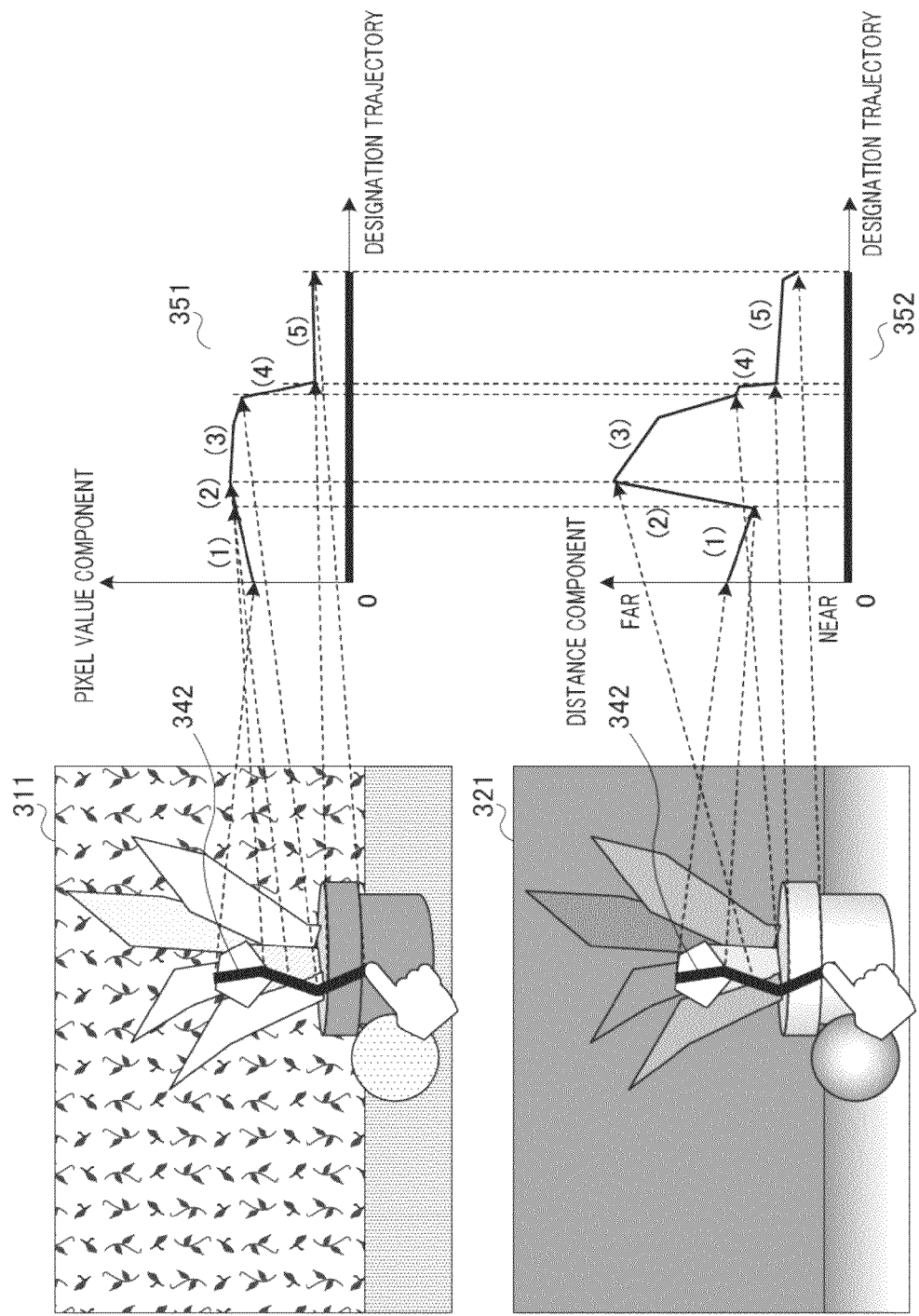
FIG. 10 illustrates one example of a spatial change of pixel value components and a spatial change of distance components in Embodiment 2.

FIG. 10 illustrates an example of the spatial change of the pixel value components and the spatial change of the distance components, and corresponds to FIG. 4, FIG. 5 and FIG. 8.

The left half of FIG. 10 illustrates an image in which designation region 342 is overlapped on left eye image 311 and an image in which designation region 342 is overlapped on distance image 321. Further, the right half of FIG. 10 illustrates graphs 351 and 352 which indicate a relationship between a trajectory the user designates as designation region 342 and the pixel value and the distance. In graph 351, the horizontal axis indicates the designation trajectory, while the vertical axis indicates the pixel value component. In graph 352, the horizontal axis indicates the designation trajectory, while the vertical axis indicates the distance component.

The designation trajectory of designation region 342 includes segment (1) of a leaf extending to the front side of the screen, segment (2) of a base of the leaf located at the back, segment (3) of another leaf located behind the leaf, segment (4) of soil of a pot, and segment (5) of an edge of the pot.

Between these segments, as illustrated in graphs 351 and 352, a degree (inclination) of the spatial change of at least one of the pixel value component and the distance component largely changes. For example, between segment (1) and segment (2), while the pixel value component increases moderately, the distance component increases drastically.

For example, between segment (1) and segment (2), while there is little change in the spatial change of the pixel value components, there is large change in the spatial change of the distance components. That is, between segment (1) and segment (2), spatial change where the distance becomes moderately small shifts to spatial change where the distance becomes drastically large. Spatial change calculating section 170 generates the designation region spatial change information including tendency of such drastic change of the spatial change.

In step S5200, spatial change learning section 180 calculates the average value and the standard deviation of the spatial change pattern for the designation region as the designation region spatial change information. Spatial change learning section 180 stores the calculated designation region spatial change information in spatial change database 190, and the processing returns to the processing in FIG. 3.

In step S6000 in FIG. 3, image region extracting apparatus 100 performs target region dividing processing. The target region dividing processing is processing for extracting a target region from an image based on the characteristic of the designation region including the pixel value change pattern and the distance change pattern.

Figure 11:
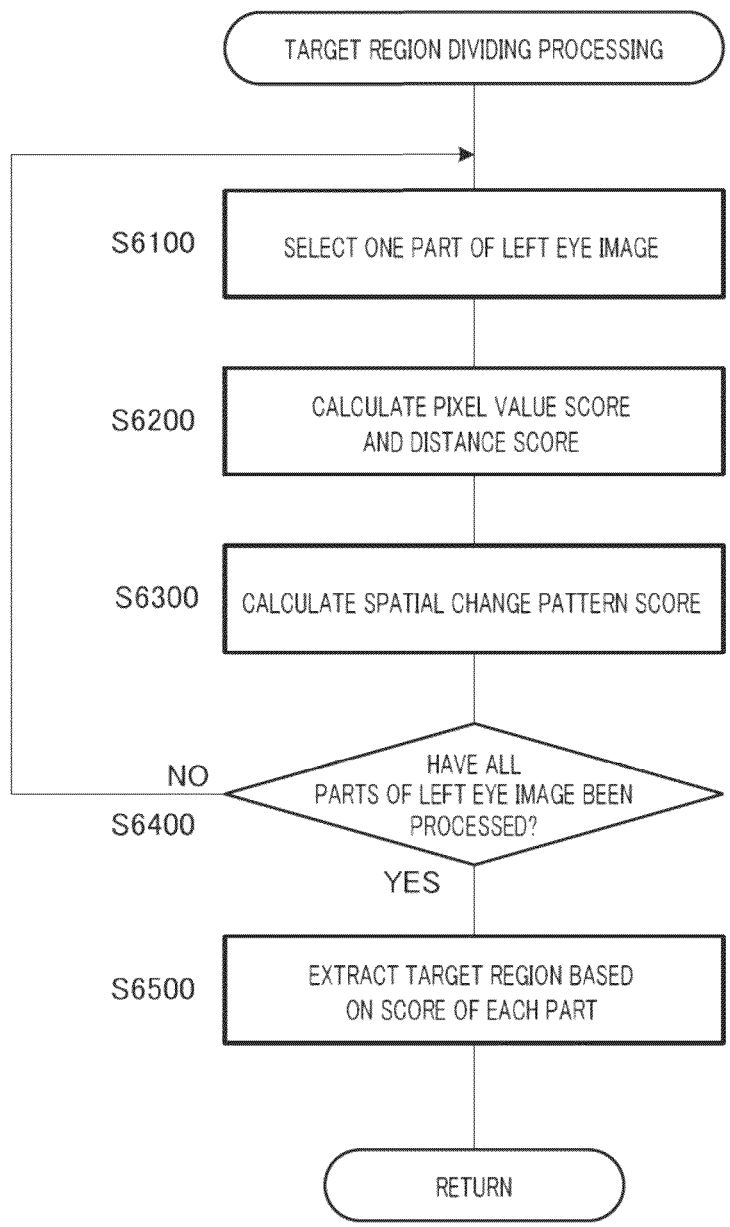
FIG. 11 is a flowchart illustrating an example of target region dividing processing in Embodiment 2.

FIG. 11 is a flowchart illustrating an example of the target region dividing processing (step S6000 in FIG. 3).

First, in step S6100, pixel value and distance learning section 150 and spatial change learning section 180 select one part (pixel) of the left eye image. It should be noted that a region to be selected is preferably a region other than the designation region among the image. Further, which pixel is selected by pixel value and distance learning section 150 and spatial change learning section 180 may be controlled by score calculating section 200.

In step S6200, pixel value and distance learning section 150 calculates a pixel value score and a distance score for the part being selected using the stored designation region information. Here, the pixel value score is an index value indicating similarity of the pixel value component between the part being selected and the designation region, while the distance score is an index value indicating similarity of the distance component between the part being selected and the designation region.

An example of a method for calculating the pixel value score and the distance score will be described below.

Pixel value and distance learning section 150 obtains an occurrence probability of the part (pixel) being selected for the pixel value component as pixel value score "score($p_{color}$)" using, for example, following equation 5 when a single Gaussian distribution is assumed. Further, pixel value and distance learning section 150 obtains an occurrence probability of the part (pixel) being selected for the distance component as pixel value score "score($p_{dist}$)" using, for example, following equation 6.

[5]
$$\text{score}(p_{color}) = \frac{1}{\sqrt{2\pi}\,\sigma_{color}} \exp\left(-\frac{(p_{color} - \overline{p}_{color})^2}{2\sigma_{color}^2}\right) \quad \text{(Equation 5)}$$

[6]
$$\text{score}(p_{dist}) = \frac{1}{\sqrt{2\pi}\,\sigma_{dist}} \exp\left(-\frac{(p_{dist} - \overline{p}_{dist})^2}{2\sigma_{dist}^2}\right) \quad \text{(Equation 6)}$$

Further, pixel value and distance learning section 150 obtains an occurrence probability of the part (pixel) being selected for the pixel value component as pixel value score "score($p_{color}$)" using, for example, following equation 7. Further, pixel value and distance learning section 150 obtains an occurrence probability of the part (pixel) being selected for the distance component as pixel value score "score($p_{dist}$)" using, for example following equation 8. It should be noted that N indicates the number of distributions, and $D_n$ indicates the n-th Gaussian distribution.

[7]
$$\text{score}(p_{color}) = \sum_{n=1}^{N} P(D_n)\text{score}(p_{color} \mid D_n) \quad \text{(Equation 7)}$$

[8]
$$\text{score}(p_{dist}) = \sum_{n=1}^{N} P(D_n)\text{score}(p_{dist} \mid D_n) \quad \text{(Equation 8)}$$

Mixture Gaussian distribution expresses learning samples using a set of a plurality of Gaussian distribution. Therefore, utilization of the mixture Gaussian distribution is effective when it is difficult to express a distribution with a single Gaussian distribution, for example, in a case where the designation region includes a plurality of color groups in which pixel values are largely different from each other, or includes a plurality of distance groups in which distance is largely different from each other. The similarity obtained by the mixture Gaussian distribution is a value obtained by summing for each distribution, products of the occurrence probability in each distribution and the similarity of the evaluation target pixel in each distribution.

In step S6300, spatial change learning section 180 calculates a spatial change pattern score for the part being selected using the stored designation region spatial change information. Here, the spatial change pattern score is an index value indicating similarity of the spatial change pattern between the part being selected and the designation region. A set of the spatial change of the pixel value components and the spatial change of the distance components will be hereinafter referred to as "pixel value and distance spatial change."

An example of the method for calculating the spatial change pattern score will be described below.

Spatial change learning section 180 obtains an occurrence probability of the part (pixel) being selected for the pixel value and distance spatial change as spatial change pattern score "score($v_{comb}$)" using, for example, following equation 9 when a single Gaussian distribution is assumed.

[9]

$$\text{score}(v_{comb}^m) = \frac{1}{\sqrt{2\pi}\,\sigma_{comb}^m} \exp\left(-\frac{(v_{comb}^m - v_{comb}^{-m})^2}{2\sigma_{comb}^{m2}}\right) \quad \text{(Equation 9)}$$

Further, spatial change learning section 180 obtains an occurrence probability of the part (pixel) being selected for the pixel value and distance spatial change as spatial change pattern score "score($v_{comb}$)" using, for example, following equation 10 when a mixture Gaussian distribution is assumed.

[10]

$$\text{score}(v_{comb}^m) = \sum_{n=1}^{N} P(D_n)\text{score}(v_{comb}^m \mid D_n) \quad \text{(Equation 10)}$$

In step S6400, score calculating section 200 judges whether or not all the parts to be selected among the left eye image have been processed. When score calculating section 200 judges that not all the parts are processed (S6400: No), the processing returns to step S6100. Alternatively, when score calculating section 200 judges that all the parts are processed (S6400: Yes), the processing proceeds to step S6500.

In step S6500, score calculating section 200 acquires pixel value score "score($p_{color}$)," pixel value score "score($p_{dist}$)" and spatial change pattern score "score($v_{comb}$)" for each calculated part. Region dividing section 210 extracts a target image from the left eye image based on pixel value score "score($p_{color}$)," pixel value score "score($p_{dist}$)" and spatial change pattern score "score($v_{comb}$)" acquired by score calculating section 200, and the processing returns to processing in FIG. 3.

An example of the method for extracting a target image will be described below.

Region dividing section 210 divides regions by obtaining a combination of pixels which optimizes the score using a graph cut method. More specifically, region dividing section 210 obtains a line which divides the left eye image into two parts such that energy E(p) expressed by following equation 11 becomes minimum. Energy E(p) is a score as an index value which indicates a likelihood that the region is the target region. As the method for minimizing energy E(p), for example, maximum flow minimum cut theorem can be used. Note that λ is a predetermined parameter coefficient.

[11]

$$E(p) = \lambda \sum_{p \in Image} g(X_{color}, X_{dist}) + \sum_{p \in Image} h(X_{color}, X_{dist}, m) \quad \text{(Equation 11)}$$

Here, $g(X_{color}, X_{dist})$ can be expressed with following equation 12, and $h(X_{color}, X_{dist}, m)$ can be expressed with following equation 13.

[12]

$$g(X_{color}, X_{dist}) = \text{score}(p_{color}) + \text{score}(p_{dist}) \quad \text{(Equation 12)}$$

[13]

$$h(X_{color}, X_{dist}, m) = \text{score}(v_{comb}^m) \quad \text{(Equation 13)}$$

In equation 11, the first term is a value depending on each pixel value in the image, such as similarity between the designation region and other parts. The second term is a value depending on change of the value between adjacent pixels, such as a difference of the pixel values between the adjacent pixels. Regarding this point, the graph cut method in this embodiment is the same as the conventional graph cut method. Further, because an energy calculation formula as expressed in equation 11 is the same as a formula in the conventional graph cut method, it is possible to perform region division in the same manner as the graph cut method.

However, in the energy calculation formula in the conventional graph cut method, a value of the second term becomes smaller when change of the value between the adjacent pixels, such as a difference in the pixel value between the adjacent pixels, is smaller. Meanwhile, in the energy calculation formula in this embodiment, a value of the second term becomes greater when similarity of the spatial change pattern between the designation region and other parts is higher. Accordingly, an advantage provided by the graph cut method in this embodiment is different from that provided by the conventional graph cut method.

In step S7000 in FIG. 3, result output section 220 outputs extraction result information (result of the target region dividing processing) indicating an extraction result of the target region.

In step S8000, stereo image photographing section 110 judges whether or not it is instructed to finish the processing by user operation, or the like. When stereo image photographing section 110 judges that it is not instructed to finish the processing (S8000: No), the processing returns to step S1000. Meanwhile, when stereo image photographing section 110 judges that it is instructed to finish the processing (S8000: Yes), a series of processing is finished.

By the above operation, image region extracting apparatus 100 can extract the target region based on similarities of the pixel value change pattern and the distance change pattern between the designation region and each part of the image.

The operation of image region extracting apparatus 100 have been described above.

As described above, image region extracting apparatus 100 according to this embodiment extracts a target region based on similarities of the pixel value change pattern and the distance change pattern between the designation region and each part of the image. By this means, image region extracting apparatus 100 can extract a target region based on the designation region with higher accuracy than the related arts.

Embodiment 3

Embodiment 3 of the present invention is an example where the similarity of the pixel value component and the similarity of the distance component are weighted according to a degree of contribution to the characteristic of the target region.

Figure 12:
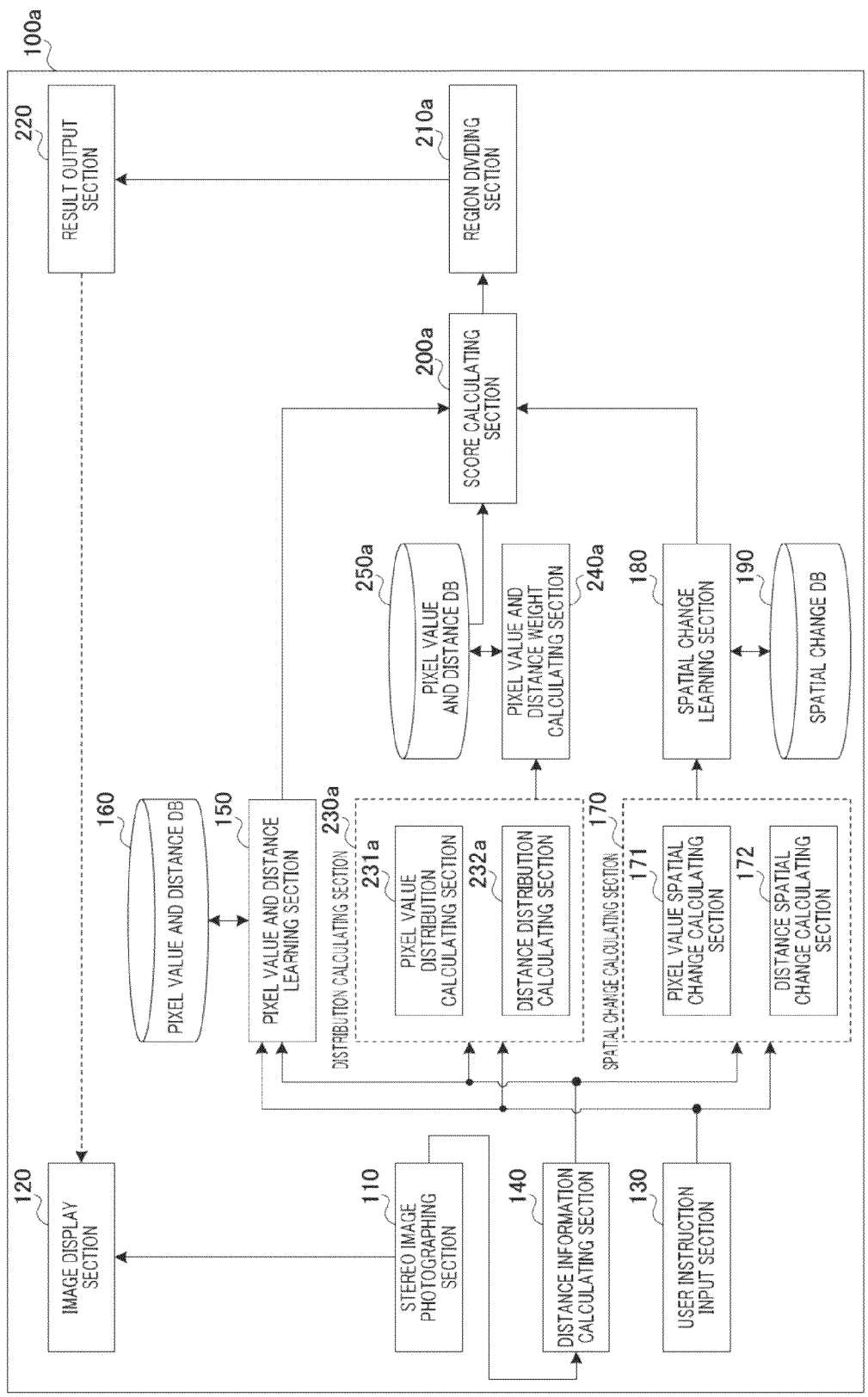
FIG. 12 is a block diagram illustrating an example of a configuration of an image region extracting apparatus according to Embodiment 3 of the present invention.

FIG. 12 is a block diagram illustrating an example of a configuration of an image region extracting apparatus according to this embodiment, and corresponding to FIG. 2 for Embodiment 2. The same reference numerals are assigned to the parts identical with those in FIG. 2, and their explanation will be omitted.

In FIG. 12, image region extracting apparatus 100a further includes distribution calculating section 230a, pixel value and distance weight calculating section 240a and pixel value and distance database (DB) 250a in addition to the configuration in FIG. 2. Further, image region extracting apparatus 100a includes score calculating section 200a and region dividing section 210a in place of score calculating section 200 and region dividing section 210 in FIG. 2.

In this embodiment, distance information calculating section 140 outputs the depth information and the left eye image also to distribution calculating section 230a. Further, user instruction input section 130 outputs the designation region information also to distribution calculating section 230a.

Distribution calculating section 230a acquires a distribution of the pixel value components and a distribution of the distance components in the designation region. In this embodiment, the distribution of the pixel value components includes dispersion of Gaussian distribution of the pixel value components, and the distribution of the distance components includes dispersion of Gaussian distribution of the distance components. Distribution calculating section 230a outputs the acquired distribution of the pixel value components and distribution of the distance components to pixel value and distance weight calculating section 240a.

It should be noted that as illustrated in FIG. 12, distribution calculating section 230a may include pixel value distribution calculating section 231a for calculating the distribution of the pixel value components and distance distribution calculating section 232a for calculating the distribution of the distance components.

Pixel value and distance weight calculating section 240a determines a degree of contribution of a characteristic of the pixel value components in the designation region to a characteristic of the target region as pixel value information coefficient (first weight) a from the input distribution of the pixel value components. Further, pixel value and distance weight calculating section 240a determines a degree of contribution of a characteristic of the distance components in the designation region to the characteristic of the target region as distance information coefficient (second weight) β from the input distribution of the distance components.

More specifically, pixel value and distance weight calculating section 240a determines lower pixel value information coefficient α for higher dispersion of the pixel value components, and determines lower distance information coefficient β for higher dispersion of the distance components. This is because it is considered that components with higher dispersion has higher uniformity of the information and provides a lower degree of contribution to the characteristic of the target region.

Pixel value and distance weight calculating section 240a stores determined pixel value information coefficient α and distance information coefficient β in pixel value and distance database 250a.

For example, pixel value and distance weight calculating section 240a has a weight determination table in advance in which the dispersion of the pixel value components is associated with pixel value information coefficient α and the dispersion of the distance components is associated with distance information coefficient β. In this case, pixel value and distance weight calculating section 240a determines pixel value information coefficient α and distance information coefficient β for each designation region with reference to the weight determination table.

FIG. 13 illustrates an example of the weight determination table.

As illustrated in FIG. 13, weight determination table 360 describes pixel value information coefficient (α) 363 and distance information coefficient (β) 364 for each combination of dispersion 361 of the distance components and dispersion 362 of the pixel value components.

The above-described pixel value information coefficient α and distance information coefficient β are stored in pixel value and distance database 250a.

Score calculating section 200a has the same function as that of score calculating section 200 in Embodiment 2, except that score calculating section 200a calculates a score based on a value obtained by adding a value resulting from multiplying the similarity of the pixel value component (pixel value score) by pixel value information coefficient α to a value resulting from multiplying the similarity of the distance component (distance score) by distance information coefficient β.

Region dividing section 210a has the same function as that of region dividing section 210 in Embodiment 2, except that region dividing section 210a extracts the target region based on a score obtained by applying pixel value information coefficient α and distance information coefficient β.

Figure 14:
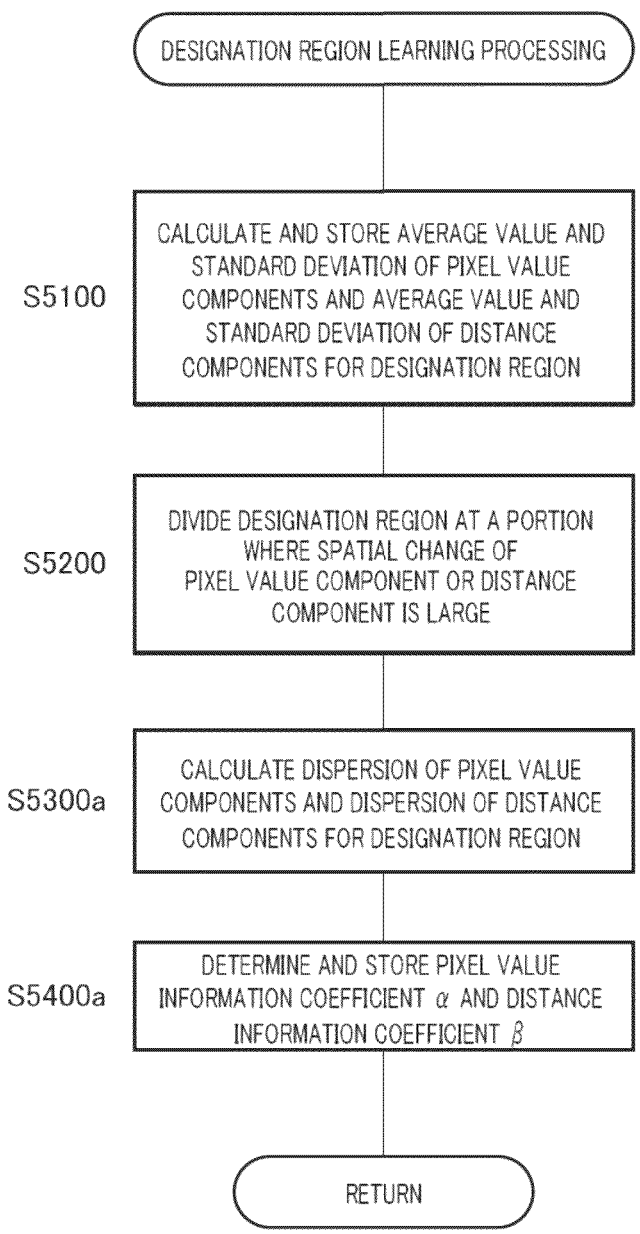
FIG. 14 is a flowchart illustrating an example of designation region learning processing in Embodiment 3.

FIG. 14 is a flowchart illustrating an example of designation region learning processing (step S5000 in FIG. 3) in this embodiment, and corresponding to FIG. 9 for Embodiment 2. The same step numbers are assigned to the steps identical with those in FIG. 9, and their explanation will be omitted.

In step S5300a, distribution calculating section 230a calculates dispersion of the pixel value components and dispersion of the distance components for the designation region.

In step S5400a, pixel value and distance weight calculating section 240a determines pixel value information coefficient α and distance information coefficient β from the dispersion of the pixel value components and the dispersion of the distance components. Pixel value and distance weight calculating section 240a stores determined pixel value information coefficient α and distance information coefficient β in pixel value and distance database 250a.

Figure 15:
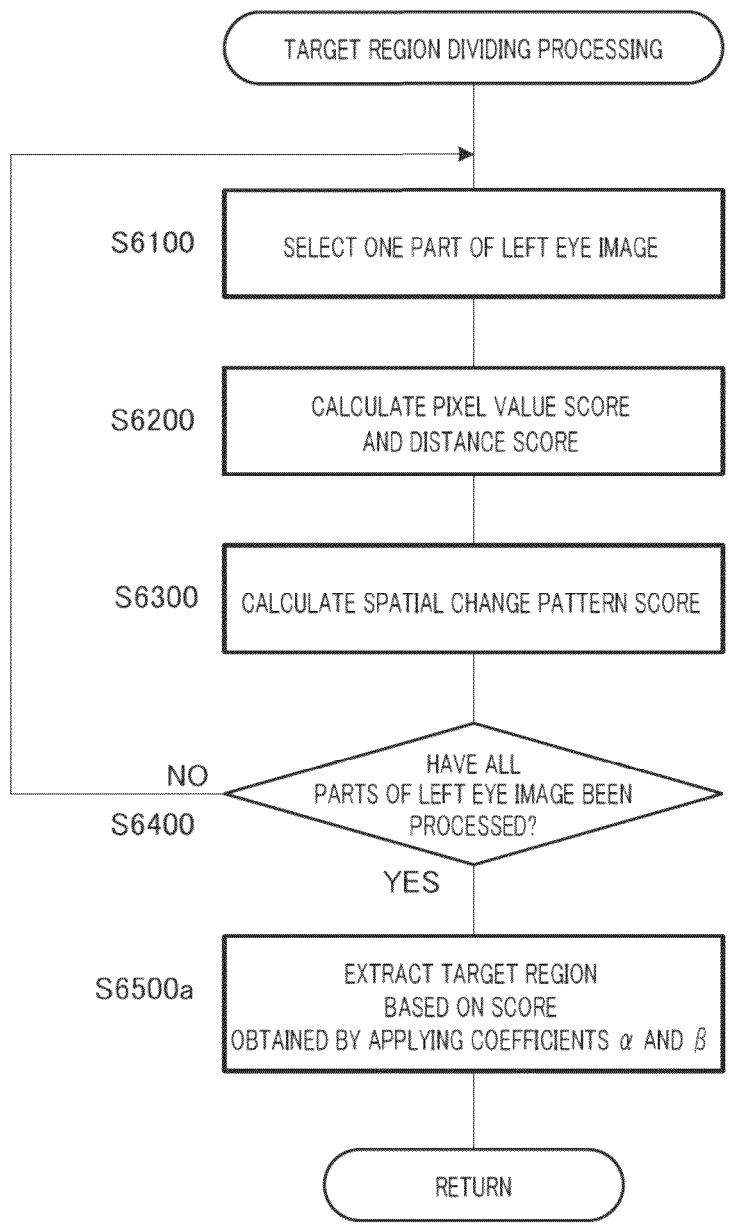
FIG. 15 is a flowchart illustrating an example of target region dividing processing in Embodiment 3.

FIG. 15 is a flowchart illustrating an example of the target region dividing processing (step S6000 in FIG. 3) in this embodiment, and corresponding to FIG. 11 for Embodiment 2. The same step numbers are assigned to the steps identical with those in FIG. 11, and their explanation will be omitted.

In step S6500a, region dividing section 210a extracts the target region based on the score obtained by applying pixel value information coefficient α and distance information coefficient β. More specifically, region dividing section 210a calculates the first term $g(X_{color}, X_{dist})$ in the energy calculation formula expressed in equation 11 using, for example, following equation 14.

[14]

$$g(X_{color}, X_{dist}) = \alpha \cdot \text{score}(p_{color}) + \beta \cdot \text{score}(p_{dist}) \quad \text{(Equation 14)}$$

Region dividing section 210a obtains a line which divides the left eye image into two parts such that energy E(p) expressed in equation 11 becomes minimum as in Embodiment 2. Energy E(p) is, as described above, a score as an index value indicating a likelihood that the region is the target region.

In this way, image region extracting apparatus 100a according to this embodiment calculates a score by weighting the similarity of the pixel value component and the similarity of the distance component according to the degree of contribution to the characteristic of the target region. Image region extracting apparatus 100a according to this embodiment extracts the target region based on the score calculated in this way. That is, image region extracting apparatus 100a can dynamically change the weighting for the similarity of the pixel value component and the similarity of the distance component according to variation of the distribution of the pixel value components and the distance components in the designation region.

Because, when, for example, both the dispersion of the distance components and the dispersion of the pixel value components (color component) are small in the designation region, the degrees of contribution of the both components to the characteristic of the target region are high, it is less necessary to assign a larger weight to the similarity of either of the components.

Meanwhile, when, for example, the dispersion of the pixel value components is high, the degree of contribution of the pixel value component to the characteristic of the target region is low, and the similarity of the pixel value component between the designation region and the target region is more likely to greatly vary. In such a case, by assigning a larger weight to the similarity of the distance component whose similarity is stable, it is possible to suppress the influence of variation of the pixel value components and improve the stability of region extraction. Meanwhile, when, the dispersion of the distance components is high, by assigning a larger weight to the similarity of the pixel component in the same way, it is possible to suppress the influence of variation of the distance components and improve the stability of region extraction.

Accordingly, it can be expected to improve the stability and accuracy of the region division in image region extracting apparatus 100a according to this embodiment.

It should be noted that when the dispersion of the distance components and the dispersion of the pixel value components are constant in the designation region, it is possible to use a fixed value for pixel value information coefficient $\alpha$ and distance information coefficient $\beta$. Further, pixel value information coefficient $\alpha$ and distance information coefficient $\beta$ may be determined using other means such as user designation.

Further, while a case has been described in this embodiment where the similarity of the pixel value component and the similarity of the distance component are weighted, image region extracting apparatus 100a may also weight the similarity of the pixel value spatial pattern and the similarity of the distance spatial pattern in the same manner. This weighting may be performed independently from the weighting of the similarity of the pixel value component and the similarity of the distance component or may be performed using a value corresponding to the weighting of the similarity of the pixel value component and the similarity of the distance component.

While a case has been described in Embodiment 2 and Embodiment 3 where the distance component of each part is acquired from the stereo image using the stereo method, the method for acquiring the distance component is not limited to this method. The image region extracting apparatus may acquire the distance component by, for example, measuring a distance using a wireless signal.

Further, the image region extracting apparatus may calculate the similarity for each pixel or for each small region formed of a plurality of pixels.

As has been described above, an image region extracting apparatus according to this disclosure is an apparatus that extracts a target region from an image based on a designation region, the apparatus including: a spatial change learning section that acquires a pixel value change pattern and a distance change pattern of each part of the image, the pixel value change pattern being a spatial change characteristic of a pixel value component, and the distance change pattern being a spatial change characteristic of a distance component from a reference position to a subject; and a region dividing section that extracts the target region based on similarities of the pixel value change pattern and the distance change pattern between the designation region and each part of the image.

In the image region extracting apparatus described above, the region dividing section may extract the target region based on similarities of the pixel value component and the distance component between the designation region and each part of the image.

The image region extracting apparatus described above may further include: a distance information calculating section that acquires the pixel value component and the distance component of each part of the image from the image; a pixel value and distance learning section that calculates the similarities of the pixel value component and the distance component; and a spatial change calculating section that calculates a spatial change of the pixel value component and a spatial change of the distance component, in which the spatial change learning section may calculate the similarities of the pixel value change pattern and the distance change pattern.

The image region extracting apparatus described above may further include a score calculating section that calculates a score indicating a likelihood that each part of the image is the target region, for each part of the image based on the similarities of the pixel value change pattern and the distance change pattern and the similarities of the pixel value component and the distance component, in which the region dividing section may extract the target region based on the score.

In the image region extracting apparatus described above: the pixel value and distance learning section may calculate the similarity of the pixel value component and the similarity of the distance component between the designation region and each part of the image; and the score calculating section may calculate the score based on a value obtained by adding a value resulting from multiplying the similarity of the pixel value component by a first weight to a value resulting from multiplying the similarity of the distance component by a second weight.

The image region extracting apparatus described above may further include: a distribution calculating section that acquires a distribution of the pixel value components and a distribution of the distance components in the designation region; and a pixel value and distance weight calculating section that determines a degree of contribution of a characteristic of the pixel value components in the designation region to a characteristic of the target region as the first weight from the distribution of the pixel value components and determines a degree of contribution of a characteristic of the distance components in the designation region to the characteristic of the target region as the second weight from the distribution of the distance components.

In the image region extracting apparatus described above: the distribution of the pixel value components may include dispersion of the pixel value components and the distribution of the distance components may include dispersion of the distance components; and the pixel value and distance weight calculating section may determine a lower weight as the first weight for higher dispersion of the pixel value components and determine a lower weight as the second weight for higher dispersion of the distance components.

In the image region extracting apparatus described above: the pixel value and distance learning section may calculate the similarity of the pixel value component using an average and standard deviation of the pixel value components in the designation region and calculate the similarity of the distance component using an average and standard deviation of the distance components in the designation region; and the spatial change learning section ma y calculate the similarity of the pixel value change pattern using an average and standard deviation of the pixel value change patterns in the designation region and calculate the similarity of the distance change pattern using an average and standard deviation of the distance change patterns in the designation region.

The image region extracting apparatus described above may further include: a stereo image photographing section that receives a stereo image including the image as input; a distance information calculating section that calculates the distance for each position in the image from the stereo image; an image display section that displays the image on a screen; a user instruction input section that receives input of the designation region from a user; and a result output section that outputs information indicating an extraction result of the target region.

An image region extracting method according to this disclosure is a method for extracting a target region from an image based on a designation region, the method including: acquiring a pixel value change pattern and a distance change pattern of each part of the image, the pixel value change pattern being a spatial change characteristic of a pixel value component, and the distance change pattern being a spatial change characteristic of a distance component from a reference position to a subject; and extracting the target region based on similarities of the pixel value change pattern and the distance change pattern between the designation region and each part of the image.

An image region extracting program according to this disclosure is a program stored on a non-transitory computer medium for extracting a target region from an image based on a designation region, the program causing a computer to execute processing including: acquiring a pixel value change pattern and a distance change pattern of each part of the image, the pixel value change pattern being a spatial change characteristic of a pixel value component, and the distance change pattern being a spatial change characteristic of a distance component from a reference position to a subject; and extracting the target region based on similarities of the pixel value change pattern and the distance change pattern between the designation region and each part of the image.

The disclosure of the specification, the drawings, and the abstract included in Japanese Patent Application No. 2011-275877 filed on Dec. 16, 2011, is incorporated herein by reference in its entirety.

INDUSTRIAL APPLICABILITY

The present invention is suitable for use as an image region extracting apparatus, an image region extracting method and an image region extracting program which can extract a target region with high accuracy based on a designation region. For example, the present invention can be applied to various apparatuses which perform image processing, such as digital still cameras, digital video cameras, smart phones and tablet type information terminals.

REFERENCE SIGNS LIST 100, 100a Image region extracting apparatus
110 Stereo image photographing section
120 Image display section
130 User instruction input section
140 Distance information calculating section
150 Pixel value and distance learning section
160 Pixel value and distance database
170 Spatial change calculating section
180 Spatial change learning section
190 Spatial change database
200, 200a Score calculating section
210, 210a Region dividing section
220 Result output section
230a Distribution calculating section
240a Pixel value and distance weight calculating section
250a Pixel value and distance database

The invention claimed is:

1. An image region extracting apparatus that extracts, from an image photographed by a camera, a target region based on a designation region, the apparatus comprising:
   a control circuit configured to acquire a pixel value change pattern and a distance change pattern of each part of the image, the pixel value change pattern being a spatial change characteristic of a pixel value component, and the distance change pattern being a spatial change characteristic of a distance component indicating a distance from a view point of the camera to a subject; and
   the control circuit being further configured to extract the target region based on similarities of the pixel value change pattern and the distance change pattern between the designation region and each part of the image.

2. The image region extracting apparatus according to claim 1, wherein the target region is extracted based on similarities of the pixel value component and the distance component between the designation region and each part of the image.

3. The image region extracting apparatus according to claim 2, wherein the control circuit is further configured to:
   acquire the pixel value component and the distance component of each part of the image from the image;
   calculate the similarities of the pixel value component and the distance component; and
   calculate a spatial change of the pixel value component and a spatial change of the distance component, wherein
   the control circuit calculates the similarities of the pixel value change pattern and the distance change pattern.

4. The image region extracting apparatus according to claim 3, wherein the control circuit is further configured to determine a score indicating a likelihood that each part of the image is the target region, for each part of the image based on the similarities of the pixel value change pattern and the distance change pattern and the similarities of the pixel value component and the distance component, wherein
   the control circuit extracts the target region based on the score.

5. The image region extracting apparatus according to claim 4, wherein the control circuit is configured to:
   calculate the similarity of the pixel value component and the similarity of the distance component between the designation region and each part of the image; and
   determine the score based on a value obtained by adding a value resulting from multiplying the similarity of the pixel value component by a first weight to a value resulting from multiplying the similarity of the distance component by a second weight.

6. The image region extracting apparatus according to claim 5, wherein the control circuit is further configured to:

acquire a distribution of the pixel value components and a distribution of the distance components in the designation region; and determine a degree of contribution of a characteristic of the pixel value components in the designation region to a characteristic of the target region as the first weight from the distribution of the pixel value components and determine a degree of contribution of a characteristic of the distance components in the designation region to the characteristic of the target region as the second weight from the distribution of the distance components.

7. The image region extracting apparatus according to claim 6, wherein:

the distribution of the pixel value components includes dispersion of the pixel value components and the distribution of the distance components includes dispersion of the distance components; and a lower weight is determined as the first weight for higher dispersion of the pixel value components and a lower weight is determined as the second weight for higher dispersion of the distance components.

8. The image region extracting apparatus according to claim 7, wherein the control circuit is further configured to:

evaluate the similarity of the pixel value component using an average and standard deviation of the pixel value components in the designation region and calculate the similarity of the distance component using an average and standard deviation of the distance components in the designation region; and calculate the similarity of the pixel value change pattern using an average and standard deviation of the pixel value change patterns in the designation region and calculates the similarity of the distance change pattern using an average and standard deviation of the distance change patterns in the designation region.

9. The image region extracting apparatus according to claim 1, further comprising:

a stereo camera that captures a stereo image including the image as input;

a display that displays the image; and a user interface that receives input of the designation region from a user, wherein the control circuit is further configured to:

determine the distance for each position in the image from the stereo image, and output information indicating an extraction result of the target region.

10. An image region extracting method for extracting, from an image photographed by a camera, a target region based on a designation region, the method comprising:

acquiring a pixel value change pattern and a distance change pattern of each part of the image, the pixel value change pattern being a spatial change characteristic of a pixel value component, and the distance change pattern being a spatial change characteristic of a distance component indicating a distance from a view point of the camera to a subject; and extracting the target region based on similarities of the pixel value change pattern and the distance change pattern between the designation region and each part of the image.

11. An image region extracting program stored on a non-transitory computer medium for extracting, from an image photographed by a camera, a target region based on a designation region, the program causing a computer to execute processing comprising:

acquiring a pixel value change pattern and a distance change pattern of each part of the image, the pixel value change pattern being a spatial change characteristic of a pixel value component, and the distance change pattern being a spatial change characteristic of a distance component indicating a distance from a view point of the camera to a subject; and extracting the target region based on similarities of the pixel value change pattern and the distance change pattern between the designation region and each part of the image.

* * * * *